US008335466B2

United States Patent
Cai et al.

(10) Patent No.: US 8,335,466 B2
(45) Date of Patent: Dec. 18, 2012

(54) SYSTEM AND METHOD FOR RESOURCE ALLOCATION

(75) Inventors: Zhijun Cai, Euless, TX (US); James Earl Womack, Bedford, TX (US); Yi Yu, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 462 days.

(21) Appl. No.: 12/340,412

(22) Filed: Dec. 19, 2008

(65) Prior Publication Data

US 2010/0159935 A1 Jun. 24, 2010

(51) Int. Cl.
*H04B 7/14* (2006.01)
*H04B 15/00* (2006.01)
*H04B 1/38* (2006.01)
*H04W 4/00* (2009.01)

(52) U.S. Cl. ............ 455/7; 455/63.1; 455/434; 455/561

(58) Field of Classification Search .......... 370/274–275, 370/279, 281, 285, 293–295, 315, 327–329, 370/331, 338, 341, 343–344, 400–401, 431, 370/492, 496, 501, 911; 455/7, 11.1, 24, 455/418, 420, 422.1, 434, 446, 450, 509, 455/550.1, 556.2, 561; 709/226, 229, 211
See application file for complete search history.

(56) References Cited

U.S. PATENT DOCUMENTS

| | | | |
|---|---|---|---|
| 6,014,375 A * | 1/2000 | Janky | 370/347 |
| 6,512,745 B1 | 1/2003 | Abe et al. | |
| 6,690,657 B1 * | 2/2004 | Lau et al. | 370/315 |
| 6,785,510 B2 | 8/2004 | Larsen | |
| 7,054,633 B2 | 5/2006 | Seo et al. | |
| 7,061,879 B2 * | 6/2006 | Oprescu-Surcobe et al. | 370/311 |
| 7,130,614 B2 | 10/2006 | Sreemanthula et al. | |
| 7,227,851 B1 * | 6/2007 | Gopalakrishnan et al. | 370/335 |
| 7,349,665 B1 | 3/2008 | Zhu et al. | |
| 7,386,036 B2 | 6/2008 | Pasanen et al. | |
| 7,564,827 B2 | 7/2009 | Das et al. | |
| 7,577,124 B2 | 8/2009 | Yomo et al. | |
| 7,602,843 B2 | 10/2009 | Cho et al. | |
| 7,673,211 B2 | 3/2010 | Meyer et al. | |
| 7,706,408 B2 | 4/2010 | Takagi et al. | |
| 7,724,767 B2 | 5/2010 | Oksman | |
| 7,742,448 B2 | 6/2010 | Ramachandran et al. | |
| 7,830,837 B2 | 11/2010 | Park et al. | |

(Continued)

FOREIGN PATENT DOCUMENTS

EP   1534035 A1   5/2005

(Continued)

OTHER PUBLICATIONS

PCT International Preliminary Report On Patentability; PCT Application No. PCT/US2009/062571; Mar. 10, 2011; 8 pgs.

(Continued)

*Primary Examiner* — Meless N Zewdu
(74) *Attorney, Agent, or Firm* — Conley Rose, P.C.; J. Robert Brown, Jr.

(57) ABSTRACT

An access node comprising a processor configured to promote allocation of a physical downlink control channel (PDCCH) resource to a relay node. The PDCCH resource is configured for use by the relay node. The access node is further configured to exclusively control allocation of the PDCCH resource.

30 Claims, 7 Drawing Sheets

U.S. PATENT DOCUMENTS

| | | | |
|---|---|---|---|
| 7,873,002 B2 * | 1/2011 | Cai | 370/329 |
| 7,898,948 B2 | 3/2011 | DiGirolamo et al. | |
| 8,121,552 B2 | 2/2012 | Agami et al. | |
| 8,228,851 B2 | 7/2012 | Wu | |
| 2002/0155839 A1 * | 10/2002 | Nisbet | 455/450 |
| 2002/0187746 A1 | 12/2002 | Cheng et al. | |
| 2003/0096631 A1 * | 5/2003 | Kayama et al. | 455/522 |
| 2003/0103480 A1 | 6/2003 | You et al. | |
| 2004/0042492 A1 | 3/2004 | Suzuki et al. | |
| 2004/0063451 A1 | 4/2004 | Bonta et al. | |
| 2005/0042987 A1 | 2/2005 | Lee et al. | |
| 2005/0232212 A1 | 10/2005 | Kang et al. | |
| 2006/0183421 A1 | 8/2006 | Proctor, Jr. et al. | |
| 2007/0104148 A1 | 5/2007 | Kang et al. | |
| 2007/0153734 A1 * | 7/2007 | Lee et al. | 370/329 |
| 2007/0155315 A1 | 7/2007 | Lee et al. | |
| 2007/0171925 A1 * | 7/2007 | Tanimoto | 370/401 |
| 2007/0206531 A1 | 9/2007 | Pajukoski et al. | |
| 2007/0253421 A1 | 11/2007 | Cai | |
| 2008/0002610 A1 | 1/2008 | Zheng et al. | |
| 2008/0025323 A1 | 1/2008 | Khan | |
| 2008/0043671 A1 | 2/2008 | Moon et al. | |
| 2008/0043710 A1 | 2/2008 | Zhou et al. | |
| 2008/0081628 A1 | 4/2008 | Ye et al. | |
| 2008/0089282 A1 | 4/2008 | Malladi et al. | |
| 2008/0107076 A1 | 5/2008 | Ramachandran et al. | |
| 2008/0107078 A1 | 5/2008 | Viorel et al. | |
| 2008/0165776 A1 | 7/2008 | Tao et al. | |
| 2008/0212513 A1 | 9/2008 | Tao et al. | |
| 2008/0225765 A1 | 9/2008 | Marinier et al. | |
| 2008/0225772 A1 | 9/2008 | Xu | |
| 2008/0227461 A1 * | 9/2008 | Dayal et al. | 455/452.2 |
| 2008/0232284 A1 | 9/2008 | Dalsgaard et al. | |
| 2008/0232493 A1 | 9/2008 | Zhang et al. | |
| 2008/0247375 A1 | 10/2008 | Muharemovic et al. | |
| 2008/0285500 A1 * | 11/2008 | Zhang et al. | 370/315 |
| 2008/0285501 A1 | 11/2008 | Zhang et al. | |
| 2008/0293358 A1 | 11/2008 | Andersson et al. | |
| 2008/0310389 A1 | 12/2008 | Suzuki et al. | |
| 2009/0010199 A1 | 1/2009 | Adachi et al. | |
| 2009/0046641 A1 | 2/2009 | Wang et al. | |
| 2009/0061892 A1 | 3/2009 | Lee et al. | |
| 2009/0111476 A1 | 4/2009 | Hamalainen et al. | |
| 2009/0116423 A1 | 5/2009 | Ni et al. | |
| 2009/0154533 A1 | 6/2009 | Khayrallah et al. | |
| 2009/0190522 A1 | 7/2009 | Horn et al. | |
| 2009/0191882 A1 * | 7/2009 | Kovacs et al. | 455/450 |
| 2009/0196332 A1 | 8/2009 | Miyatani | |
| 2009/0239568 A1 | 9/2009 | Bertrand et al. | |
| 2009/0252079 A1 | 10/2009 | Zhang et al. | |
| 2009/0264077 A1 | 10/2009 | Damnjanovic | |
| 2009/0276672 A1 | 11/2009 | Lee et al. | |
| 2009/0291679 A1 | 11/2009 | Wu | |
| 2009/0303918 A1 | 12/2009 | Ma et al. | |
| 2009/0325480 A1 | 12/2009 | Ji et al. | |
| 2009/0325618 A1 | 12/2009 | Aiba et al. | |
| 2010/0027457 A1 * | 2/2010 | Okuda | 370/315 |
| 2010/0027458 A1 | 2/2010 | Wu et al. | |
| 2010/0039947 A1 * | 2/2010 | Li et al. | 370/252 |
| 2010/0046413 A1 | 2/2010 | Jin et al. | |
| 2010/0046418 A1 | 2/2010 | Horn et al. | |
| 2010/0056197 A1 * | 3/2010 | Attar et al. | 455/522 |
| 2010/0061361 A1 * | 3/2010 | Wu | 370/350 |
| 2010/0074209 A1 | 3/2010 | Montojo et al. | |
| 2010/0091759 A1 | 4/2010 | Stahl et al. | |
| 2010/0098045 A1 | 4/2010 | Miyazaki | |
| 2010/0103845 A1 | 4/2010 | Ulupinar et al. | |
| 2010/0120442 A1 * | 5/2010 | Zhuang et al. | 455/450 |
| 2010/0131814 A1 | 5/2010 | Chiu | |
| 2010/0135231 A1 | 6/2010 | Harada et al. | |
| 2010/0135251 A1 | 6/2010 | Sambhwani et al. | |
| 2010/0142433 A1 | 6/2010 | Womack et al. | |
| 2010/0182992 A1 | 7/2010 | Chun et al. | |
| 2010/0271999 A1 | 10/2010 | Yu et al. | |
| 2010/0297993 A1 | 11/2010 | Heo et al. | |
| 2010/0302998 A1 | 12/2010 | Bao et al. | |
| 2010/0322145 A1 | 12/2010 | Yu et al. | |
| 2010/0322194 A1 | 12/2010 | Hu et al. | |
| 2010/0323612 A1 | 12/2010 | Xu et al. | |
| 2010/0323614 A1 | 12/2010 | Yu et al. | |
| 2010/0323684 A1 | 12/2010 | Cai et al. | |
| 2010/0325506 A1 | 12/2010 | Cai et al. | |
| 2011/0026409 A1 | 2/2011 | Hu et al. | |
| 2011/0041027 A1 | 2/2011 | Fong et al. | |
| 2011/0092212 A1 | 4/2011 | Kubota | |
| 2011/0110258 A1 | 5/2011 | Ishii et al. | |
| 2011/0261763 A1 | 10/2011 | Chun et al. | |

FOREIGN PATENT DOCUMENTS

| | | |
|---|---|---|
| EP | 1773091 A2 | 4/2007 |
| EP | 1775983 A1 | 4/2007 |
| EP | 1883178 A2 | 1/2008 |
| EP | 1890402 A2 | 2/2008 |
| EP | 1919234 A2 | 5/2008 |
| EP | 1940185 A1 | 7/2008 |
| EP | 1959708 A1 | 8/2008 |
| EP | 1995921 A2 | 11/2008 |
| JP | 2004328665 A | 11/2004 |
| JP | 2006311253 A | 11/2006 |
| JP | 2008104096 A | 5/2008 |
| JP | 2008118652 A | 5/2008 |
| JP | 2008271270 A | 11/2008 |
| JP | 2009520435 A1 | 5/2009 |
| JP | 2009182944 A | 8/2009 |
| JP | 2010136337 A | 6/2010 |
| WO | 0137590 A1 | 5/2001 |
| WO | 2005064872 A1 | 7/2005 |
| WO | 2006024321 A1 | 3/2006 |
| WO | 2007048247 A1 | 5/2007 |
| WO | 2007053950 A1 | 5/2007 |
| WO | 2007053954 A1 | 5/2007 |
| WO | 2007060731 A1 | 5/2007 |
| WO | 2007064249 A1 | 6/2007 |
| WO | 2007073121 A1 | 6/2007 |
| WO | 2007083230 A2 | 7/2007 |
| WO | 2007110447 A1 | 10/2007 |
| WO | 2007131347 A1 | 11/2007 |
| WO | 2008004806 A1 | 1/2008 |
| WO | 2008009228 A1 | 1/2008 |
| WO | WO 2008/004806 A1 * | 1/2008 |
| WO | WO 2008/009228 A1 * | 1/2008 |
| WO | 2008022132 A2 | 2/2008 |
| WO | 2008040930 A1 | 4/2008 |
| WO | 2008047870 A1 | 4/2008 |
| WO | 2008050961 A1 | 5/2008 |
| WO | 2008084949 A1 | 7/2008 |
| WO | 2008103981 A2 | 8/2008 |
| WO | 2008109912 A1 | 9/2008 |
| WO | 2008115826 A1 | 9/2008 |
| WO | 2008133307 A1 | 11/2008 |
| WO | 2008149979 A1 | 12/2008 |
| WO | 2009017005 A1 | 2/2009 |
| WO | 2009088172 A2 | 7/2009 |
| WO | 2009154038 A1 | 12/2009 |
| WO | 2010002100 A2 | 1/2010 |

OTHER PUBLICATIONS

Office Action dated Jan. 25, 2011, 39 pages, U.S. Appl. No. 12/337,207, filed Dec. 17, 2008.

Notice of Allowance dated Mar. 25, 2011, 11 pages, U.S. Appl. No. 12/337,214, filed Dec. 17, 2008.

Final Office Action dated Jan. 14, 2011, 16 pages, U.S. Appl. No. 12/337,222, filed Dec. 17, 2008.

3GPP TS 36.321 v8.1.0; 3rd Generation Partnership Project; Technical Specification Group Radio Access Network; Evolved Universal Terrestrial Radio Access (E-UTRA) Medium Access Control (MAC) Protocol Specification; Release 8; Mar. 2008; 30 pgs.

Panasonic; 3GPP TSG RAN WG1 Meeting #54; Title: Discussion on the Various Types of Relays; R1-082397; Warsaw, Poland; Jun. 30-Jul. 4, 2008; 6 pgs.

Research in Motion, Limited; 3GPP TSG RAN WG1 Meeting #55; Title: L2 Relay Interference Mitigation; R1-084102; Prague, Czech Republic; Nov. 10-14, 2008; 6 pgs.

Research in Motion, Limited; 3GPP TSG RAN WG1 Meeting #55-bis; Title: Relay Control Signalling Resource Coordination;

R1-090027; Ljubljana, Slovenia; Jan. 12-16, 2009; 3 pgs.
PCT International Search Report; PCT Application No. PCT/US2009/062551; Jan. 28, 2010; 4 pgs.
PCT Written Opinion of the International Searching Authority; PCT Application No. PCT/US2009/062551; Jan. 28, 2010; 5 pgs.
PCT Communication Relating to the Results of the Partial International Search; PCT Application No. PCT/US2009/062554; Mar. 2, 2010; 7 pgs.
PCT International Search Report; PCT Application No. PCT/US2009/062557; Feb. 10, 2010; 4 pgs.
PCT Written Opinion of the International Searching Authority; PCT Application No. PCT/US2009/062557; Feb. 10, 2010; 7 pgs.
PCT International Search Report; PCT Application No. PCT/US2009/062560; Mar. 1, 2010; 4 pgs.
PCT Written Opinion of the International Searching Authority; PCT Application No. PCT/US2009/062560; Mar. 1, 2010; 7 pgs.
PCT International Search Report; PCT Application No. PCT/US2009/062570; Feb. 22, 2010; 4 pgs.
PCT Written Opinion of the International Searching Authority; PCT Application No. PCT/US2009/062570; Feb. 22, 2010; 8 pgs.
PCT Communication Relating to the Results of the Partial International Search; PCT Application No. PCT/US2009/062571; Feb. 12, 2010; 6 pgs.
PCT International Search Report; PCT Application No. PCT/US2009/064398; Mar. 18, 2010; 5 pgs.
PCT Written Opinion of the International Searching Authority; PCT Application No. PCT/US2009/064398; Mar. 18, 2010; 9 pgs.
Parkvall, Stefan, et al., The Evolution of WCDMA Towards Higher Speed Downlink Packet Data Access, XP-001082550, IEEE VTC, 2001, pp. 2287-2291.
Doppler, Klaus, et al., Assesment of Relay Based Deployment Concepts and Detailed Description of Multi-hop Capable RAN Protocols as Input for the Concept Group Work; IST-4-027756 Winner II; D3.5.2 v1.0; XP-002526747; 24 pages.
PCT International Search Report; PCT Application No. PCT/US2009/062554; May 12, 2010; 6 pgs.
PCT Written Opinion of the International Searching Authority; PCT Application No. PCT/US2009/062554; May 12, 2010; 7 pgs.
PCT International Search Report; PCT Application No. PCT/US2009/062571; Apr. 19, 2010; 6 pgs.
PCT Written Opinion of the International Searching Authority; PCT Application No. PCT/US2009/062571; Apr. 19, 2010; 6 pgs.
PCT Communication Invitation to Pay Additional Fees and, Where Applicable, Protest Fee; PCT Application No. PCT/US2009/062574; Apr. 22, 2010; 8 pgs.
Office Action dated May 26, 2010, 20 pages, U.S. Appl. No. 12/337,214, filed Dec. 17, 2008.
PCT International Search Report; PCT Application No. PCT/US2009/062574; Jul. 19, 2010; 6 pgs.
PCT Written Opinion of the International Searching Authority; PCT Application No. PCT/US2009/062574; Jul. 19, 2010; 9 pgs.
Womack, James Earl, et al.; U.S. Appl. No. 12/331,992, filed Dec. 10, 2008; Title: Method and Apparatus for Discovery of Relay Nodes.
Womack, James Earl, et al.; U.S. Appl. No. 12/340,418, filed Dec. 19, 2008; Title: System and Method for Relay Node Selection.
Yu, Yi, et al.; U.S. Appl. No. 12/337,229, filed Dec. 17, 2008; Title: System and Method for Hybrid Automatic Repeat Request (HARQ) Functionality in a Relay Node.
Yu, Yi, et al.; U.S. Appl. No. 12/337,207, filed Dec. 17, 2008; Title: System and Method for Multi-User Multiplexing.
Womack, James Earl, et al.; U.S. Appl. No. 12/337,235, filed Dec. 17, 2008; Title: System and Method for Initial Access to Relays.
Cai, Zhijun, et al.; U.S. Appl. No. 12/337,214, filed Dec. 17, 2008; Title: System and Method for Autonomous Combining.
Yu, Yi, et al.; U.S. Appl. No. 12/340,432, filed Dec. 19, 2008; Title: Multiple-Input Multiple-Output (MIMO) with Relay Nodes.
Cai, Zhijun, et al.; U.S. Appl. No. 12/337,222, filed Dec. 17, 2008; Title: System and Method for a Relay Protocol Stack.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 117 pgs.; Part 1.

IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 101 pgs.; Part 2.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 96 pgs.; Part 3.
PCT International Search Report; PCT Application No. PCT/US2009/030967; Sep. 8, 2009; 5 pgs.
PCT Written Opinion of the International Searching Authority; PCT Application No. PCT/US2009/030967; Sep. 8, 2009; 9 pgs.
3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.
Panasonic; 3GPP TSG RAN WG1 Meeting #54bis; Title: Discussion on the TD Relay and FD Relay for FDD System; R1-083676; Prague, Czech Republic; Sep. 29-Oct. 3, 2008; 5 pgs.
Texas Instruments; 3GPP TSG RAN WG1 #54bis; Title: Decod and Forward Relays for E-UTRA Enhancements; R1-083533; Prague, Czech Republic; Sep. 29-Oct. 3, 2008; 5 pgs.
3GPP TS 36.331 v8.3.0; 3rd Generation Partnership Project; Technical Specification Group Radio Access Network; Evolved Universal Terrestrial Radio Access (E-UTRA) Radio Resource Control (RRC); Protocol Specification; Release 8; Sep. 2008; 178 pgs.
3GPP TS 36.212 v8.4.0; 3rd Generation Partnership Project; Technical Specification Group Radio Access Network; Evolved Universal Terrestrial Radio Access (E-UTRA); Multiplexing and Channel Coding; Release 8; Sep. 2008; 56 pgs.
3GPP TS 36.304 v8.3.0; 3rd Generation Partnership Project; Technical Specification Group Radio Access Network; Evolved Universal Terrestrial Radio Access (E-UTRA); User Equipment (UE) Procedures in Idle Mode; Release 8; 28 pgs.
3GPP TS 36.321 v8.3.0; 3rd Generation Partnership Porject; Technical Specification Group Radio Access Network; Evolved Universal Terrestrial Radio Access (E-UTRA) Medium Access Control (MAC) Protocol Specification; Release 8; Sep. 2008; 36 pgs.
Qualcomm Europe; 3GPP TSG-RAN WG1 #54; Title: Operation of Relays in LTE-A; R1-083191; Jeju, S. Korea; Aug. 18-22, 2008; 5 pgs.
Mitsubishi Electric; 3GPP TSG RAN WG1 #54 Meeting; Title: Basic Structure of Relaying under Multi-Antenna eNB; R1-082775; Jeju Island, Korea; Aug. 18-22, 2008; 4 pgs.
China Mobile, Vodafone, Huawei; TSG-RAN WG1 #54; Title: Application Scenarios for LTE-Advanced Relay; R1-082975; Jeju, Korea; Aug. 18-22, 2008; 7 pgs.
Motorola; TSG-RAN WG1 #54; Title: Classification of Relays; R1-083223; Jeju, South Korea; Aug. 18-22, 2008; 3 pgs.
Samsung; 3GPP TSG RAN WG1 Meeting #53bis; Title: Application of Network Coding in LTE-Advanced Relay; R1-082327; Warsaw, Poland; Jun. 30-Jul. 4, 2008; 4 pgs.
Ericsson; TSG-RAN WG1 #53; Title: A Discussion on Some Technology Components for LTE-Advanced; R1-082024; Kansas City, Missouri; May 5-9, 2008; 11 pgs.
3GPP TR 36.913 v1.0.0; 3rd Generation Partnership Project; Technical Specification Group Radio Access Network; Requirements for Further Advancements for E-UTRA (LTE-Advanced); Release 8; May 2008; 13 pgs.
Soldani, David et al.; Title: Wireless Relays for Broadband Access; IEEE Communications Magazine; Mar. 2008; pp. 58-66.
Pabst, Ralf et al.; Title: Relay-Based Deployment Concepts for Wireless and Mobile Broadband Radio; IEEE Communications Magazine; Sep. 2004; pp. 80-89.
Cai, Zhijun, et al.; U.S. Appl. No. 12/916,214, filed Oct. 29, 2010; Title: System and Method for Autonomous Combining.
Office Action dated Jul. 12, 2010, 40 pages, U.S. Appl. No. 12/337,207, filed Dec. 17, 2008.
Notice of Allowance dated Nov. 8, 2010, 10 pages, U.S. Appl. No. 12/337,214, filed Dec. 17, 2008.
Office Action dated Aug. 17, 2010, 25 pages, U.S. Appl. No. 12/337,222, filed Dec. 17, 2008.

Cai, Zhijun, et al.; U.S. Appl. No. 13/221,584, filed Aug. 30, 2011; Title: System and Method for Autonomous Combining.
Office Action dated Aug. 19, 2011; U.S. Appl. No. 12/331,992, filed Dec. 10, 2008; 52 pgs.
Office Action dated Jul. 21, 2011; U.S. Appl. No. 12/340,418, filed Dec. 19, 2008; 34 pgs.
Office Action dated Jul. 13, 2011; U.S. Appl. No. 12/337,207, filed Dec. 17, 2008; 34 pgs.
Office Action dated Jul. 22, 2011; U.S. Appl. No. 12/337,235, filed Dec. 17, 2008; 36 pgs.
Notice of Allowance dated May 27, 2011; U.S. Appl. No. 12/337,214, filed Dec. 17, 2008; 10 pgs.
Office Action dated Jul. 18, 2011; U.S. Appl. No. 12/340,432, filed Dec. 19, 2008; 6 pgs.
Office Action dated Jun. 1, 2011; U.S. Appl. No. 12/337,222, filed Dec. 17, 2008; 2 pgs.
PCT International Preliminary Report on Patentability; PCT Application No. PCT/US2009/030967; Jun. 14, 2011; 11 pgs.
Australian Examination Report; Application No. 2009325082; Jul. 11, 2011; 2 pgs.
PCT International Preliminary Report On Patentability; PCT Application No. PCT/US2009/062551; Jun. 21, 2011; 6 pgs.
PCT International Preliminary Report on Patentability; PCT Application No. PCT/US2009/062554; Jun. 21, 2011; 8 pgs.
PCT International Preliminary Report On Patentability; PCT Application No. PCT/US2009/062557; Jun. 21, 2011; 7 pgs.
PCT International Preliminary Report On Patentability; PCT Application No. PCT/US2009/062560; Jun. 21, 2011; 8 pgs.
PCT International Preliminary Report On Patentability; PCT Application No. PCT/US2009/062570; Jun. 21, 2011; 9 pgs.
PCT International Preliminary Report On Patentability; PCT Application No. PCT/US2009/062574; Jun. 21, 2011; 10 pgs.
PCT International Preliminary Report On Patentability; PCT Application No. PCT/US2009/064398; Jun. 21, 2011; 10 pgs.
Rohde & Schwarz; "UMTS Long Term Evolution (LTE) Technology Introduction;" Application Note 1MA111; Sep. 2008; 55 pages.
Yu, Yi, et al.; U.S. Appl. No. 13/216,819, filed Aug. 24, 2011; Title: Multiple-Input Multiple-Output (MIMO) with Relay Nodes.
Cai, Zhijun, et al.; U.S. Appl. No. 13/221,583, filed Aug. 30, 2011; Title: System and Method for Autonomous Combining.
Final Office Action dated Dec. 9, 2011; U.S. Appl. No. 12/331,992, filed Dec. 10, 2008; 24 pgs.
Office Action dated Sep. 16, 2011; U.S. Appl. No. 12/340,432, filed Dec. 19, 2008; 33 pgs.
Office Action dated Nov. 10, 2011; U.S. Appl. No. 13/216,819, filed Aug. 25, 2011; 19 pgs.
Final Office Action dated Jan. 5, 2012; U.S. Appl. No. 12/340,418, filed Dec. 19, 2008; 22 pgs.
Final Office Action dated Dec. 16, 2011; U.S. Appl. No. 12/337,207, filed Dec. 17, 2008; 37 pgs.
Advisory Action dated Mar. 2, 2012; U.S. Appl. No. 12/337,207, filed Dec. 17, 2008; 3 pages.
Final Office Action dated Jan. 9, 2012; U.S. Appl. No. 12/337,235, filed Dec. 17, 2008; 26 pgs.
Office Action dated Feb. 1, 2012; U.S. Appl. No. 12/337,222, filed Dec. 17, 2008; 20 pgs.
Australian Office Action; Application No. 2009333788; Dec. 8, 2011; 3 pages.
Office Action dated Mar. 21, 2012; U.S. Appl. No. 12/337,229, filed Dec. 17, 2008; 49 pages.
Notice of Allowance dated Jun. 12, 2012; U.S. Appl. No. 12/337,207, filed Dec. 17, 2008; 20 pages.
Advisory Action dated Mar. 22, 2012; U.S. Appl. No. 12/337,235, filed Dec. 17, 2008; 10 pages.
Final Office Action dated Mar. 23, 2012; U.S. Appl. No. 12/340,432, filed Dec. 19, 2008; 28 pgs.
Final Office Action dated Apr. 19, 2012; U.S. Appl. No. 13/216,819, filed Aug. 25, 2011; 39 pgs.
Final Office Action dated Jun. 7, 2012; U.S. Appl. No. 12/337,222, filed Dec. 17, 2008; 16 pgs.
Australian Examination Report; Application No. 2009325082; Mar. 28, 2012; 3 pages.
European Examination Report; Application No. 09748915.7; May 14, 2012; 3 pages.
European Examination Report; Application No. 09761065.3; May 7, 2012; 4 pages.
European Examination Report; Application No. 09756080.9; Jun. 15, 2012; 5 pages.
Yu, Yi, et al.; U.S. Appl. No. 13/548,817, filed Jul. 13, 2012; Title: System and Method for Multi-User Multiplexing.
Office Action dated Oct. 2, 2012; U.S. Appl. No. 12/340,418, filed Dec. 19, 2008; 29 pgs.
Notice of Allowance dated Aug. 28, 2012; U.S. Appl. No. 12/337,229, filed Dec. 17, 2008; 6 pages.
Office Action dated Oct. 12, 2012; U.S. Appl. No. 13/548,807, filed Jul. 13, 2012; 53 pages.
Notice of Allowance dated Sep. 11, 2012; U.S. Appl. No. 12/337,235, filed Dec. 17, 2008; 16 pages.
Office Action dated Aug. 9, 2012; U.S. Appl. No. 12/916,214, filed Oct. 29, 2010; 51 pages.
Korean Office Action; Application No. 10-2011-7015882; Sep. 18, 2012; 10 pages.
Korean Office Action; Application No. 10-2011-7016626; Jul. 17, 2012; 7 pages.
3GPP TSG RAN WG3 Meeting #57; "Correction of Synchronization, Handover, Trace, eMBMS Architecture, and S1 Common Functions and Procedures"; R3-071695/R2-073880; Athens, Greece; Aug. 20-24, 2007; 108 pages.
3GPP TSG-RAN-WG1 Meeting #54bis; "Further Details and Considerations of Different Types of Relays"; R1-083712; Prague, Czech Republic; Sep. 29-Oct. 3, 2008; 6 pages.
Sendonaris, Andrew, et al.; "User Cooperation Diversity—Part I: System Description"; IEEE Transactions on Communications; vol. 51, No. 11; Nov. 2003; 12 pages.
Sendonaris, Andrew, et al.; "User Cooperation Diversity—Part II: Implementation Aspects and Performance Analysis"; IEEE Transactions on Communications; vol. 51, No. 11; Nov. 2003; 10 pages.
Japanese Office Action; Application No. 2011-540716; Oct. 4, 2012; 15 pages.
Japanese Office Action; Application No. 2011-542162; Oct. 17, 2012; 10 pages.
Japanese Office Action; Application No. 2011-542164; Oct. 26, 2012; 7 pages.
Japanese Office Action; Application No. 2011-542165; Oct. 26, 2012; 7 pages.
Korean Office Action; Application No. 10-2011-7016425; Oct. 30, 2012; 9 pages.
Japanese Office Action; Application No. 2011-542177; Oct. 26, 2012; 10 pages.
Korean Office Action; Application No. 10-2011-7016626; Ocobter 26, 2012; 8 pages.

* cited by examiner

SYSTEM AND METHOD FOR RESOURCE ALLOCATION

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" and "access device" may be used interchangeably, but it is understood that an access node may comprise a plurality of hardware and software.

The term "access node" does not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may used serially to extend or enhance coverage created by an access node.

An LTE system can include protocols such as a Radio Resource Control (RRC) protocol, which is responsible for the assignment, configuration, and release of radio resources between a UA and a network node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
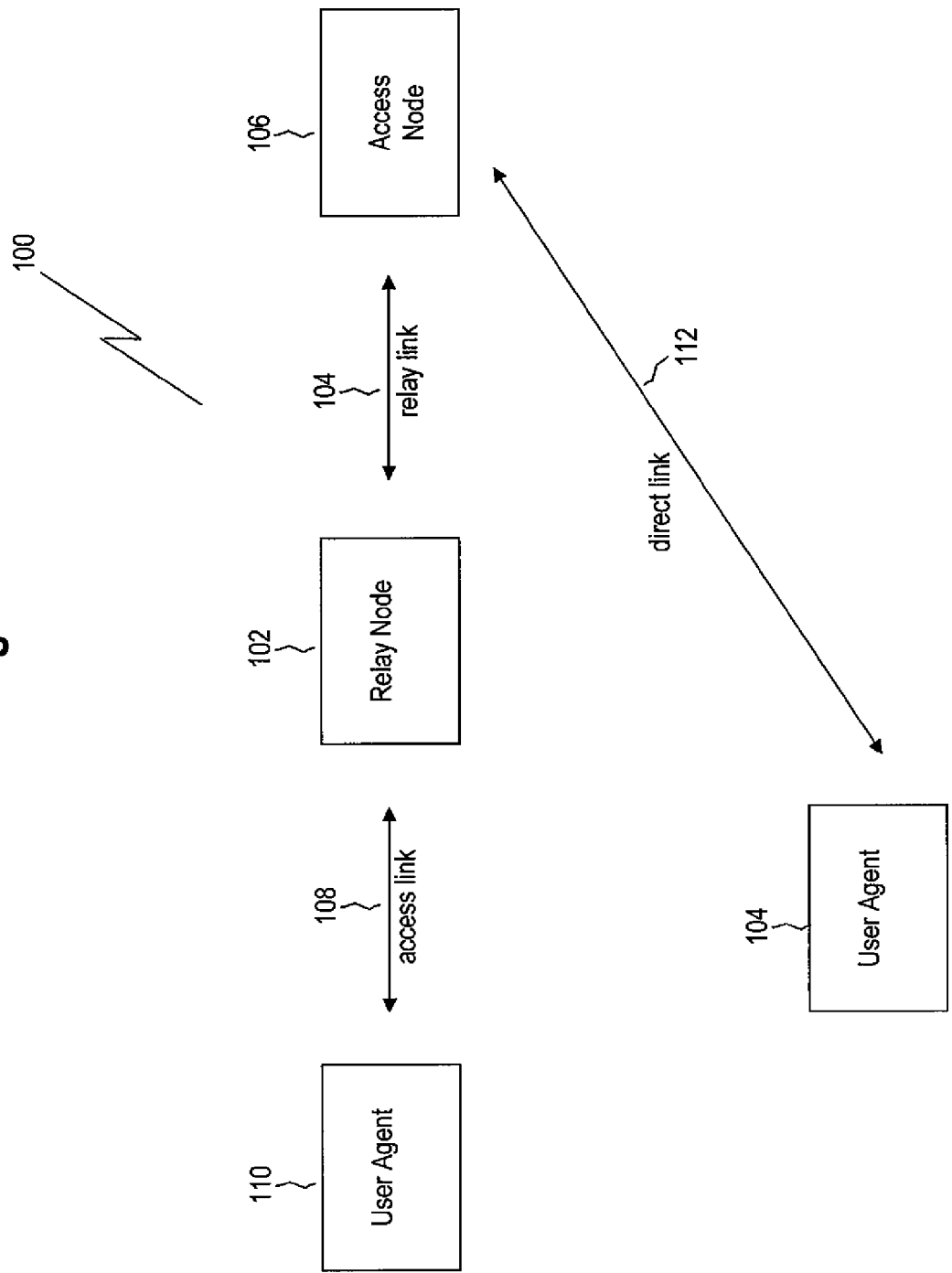
FIG. 1 is a diagram illustrating a wireless communication system using a relay, according to an embodiment of the disclosure.

FIG. 1 is a diagram illustrating a wireless communication system 100 using a relay node 102, according to an embodiment of the disclosure. Generally, the present disclosure relates to the use of relay nodes in wireless communications networks. Examples of wireless communication networks include LTE or LTE-Advanced (LTE-A) networks, and all of the disclosed and claimed embodiments could be implemented in an LTE-A network. The relay node 102 can amplify or repeat a signal received from a UA 110 and cause the modified signal to be received at an access node 106. In some implementations of a relay node 102, the relay node 102 receives a signal with data from the UA 110 and then generates a new signal to transmit the data to the access node 106. The relay node 102 can also receive data from the access node 106 and deliver the data to the UA 110. The relay node 102 might be placed near the edges of a cell so that the UA 110 can communicate with the relay node 102 in a "donor" cell rather than communicating directly with the access node 106 for that cell.

In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within or near a cell, or to extend the size of coverage of a cell. Additionally, the use of a relay node 102 can enhance throughput of a signal within a cell because the UA 110 can access the relay node 102 at a higher data rate or a lower power transmission than the UA 110 might use when communicating directly with the access node 106 for that cell. Transmission at a higher data rate creates higher spectrum efficiency, and lower power benefits the UA 110 by consuming less battery power.

Relay nodes, generally, can be divided into three types: layer one relay nodes, layer two relay nodes, and layer three relay nodes. A layer one relay node is essentially a repeater that can retransmit a transmission without any modification other than amplification and slight delay. A layer two relay node can decode a transmission that it receives, re-encode the result of the decoding, and then transmit the re-encoded data. A layer three relay node can have full radio resource control capabilities and can thus function similarly to an access node. The radio resource control protocols used by a relay node may be the same as those used by an access node, and the relay node may have a unique cell identity typically used by an access node. For the purpose of this disclosure, a relay node is distinguished from an access node by the fact that it requires the presence of at least one access node (and the cell associated with that access node) or other relay node to access other components in a telecommunications system. The illustrative embodiments are primarily concerned with layer two or layer three relay nodes. Therefore, as used herein, the term "relay node" will not refer to layer one relay nodes, unless specifically stated otherwise.

In communication system 100, the links that allow wireless communication can be said to be of three distinct types. First, when the UA 110 is communicating with the access node 106 via the relay node 102, the communication link between the UA 110 and the relay node 102 is said to occur over an access link 108. Second, the communication between the relay node 102 and the access node 106 is said to occur over a relay link 104. Third, communication that passes directly between the UA 110 and the access node 106 without passing through the relay node 102 is said to occur over a direct link 112. The terms "access link," "relay link," and "direct link" are used in this document according to the meaning described by FIG. 1.

As provided above, some wireless communication systems implement relay nodes. However, during wireless communications some UAs may communicate directly with the access node while others use the relay node to communicate with the access node. This simultaneous use of both the access node and the relay node to provide communications to multiple UAs may generate undesirable interference.

This interference can be overcome using a central control mechanism. In one embodiment, an access node is the central control mechanism. The access node includes a processor configured to promote allocation of a physical downlink control channel (PDCCH) resource to a relay node. The PDCCH resource is configured for use by the relay node. The access node is further configured to exclusively control allocation of the PDCCH resource. The concept of central control is described more fully with respect to FIG. 2 through FIG. 6B.

Figure 2:
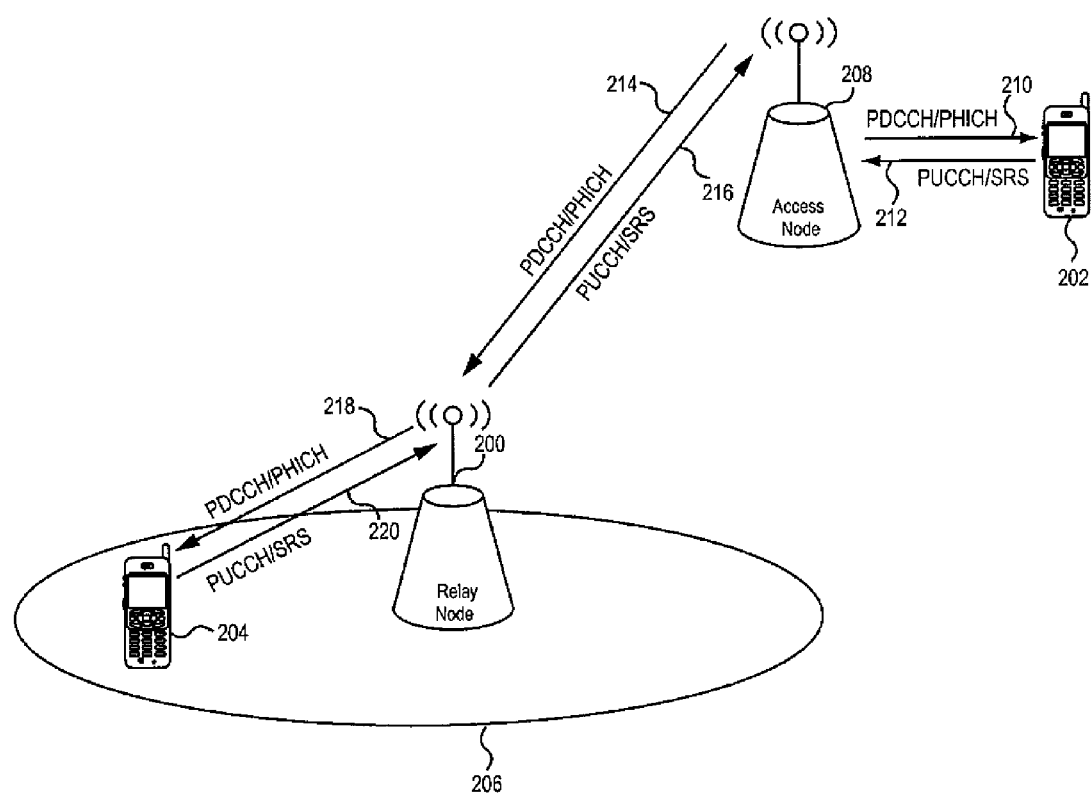
FIG. 2 is a diagram illustrating control signaling over different links, according to an embodiment of the disclosure.

FIG. 2 is a diagram illustrating control signaling over different links, according to an embodiment of the disclosure. The basic operation of the elements shown in FIG. 2 is the same as the operation of the corresponding elements shown in FIG. 1. Thus, for example, relay node 200 is similar to relay node 102, UA 204 is similar to UA 110, UA 202 is similar to UA 104, and access node 208 is similar to access node 106 in FIG. 1. Additionally, FIG. 2 further illustrates control signaling with respect to relay node 200. Relay node 200 operates within relay (donor) cell 206.

Some relays might have medium access control (MAC) functionality that impacts the way that adaptive modulation and coding (AMC) and hybrid automatic repeat request (HARQ) are performed with respect to the access link between relay node 200 and UA 204. As used herein, medium access control (MAC) is a data communication protocol sub-layer of the data link layer specified in the seven layer OSI model. The medium access control is layer two of the OSI model. MAC functionality provides addressing and channel access control mechanisms that make possible several terminals or network nodes to communicate with a multipoint network. MAC functionality also acts as an interface between the radio link control (RLC) sub-layer and the network's physical layer. As used herein, adaptive modulation and coding (AMC) denotes the matching of the modulation, coding, and other signal and protocol parameters to the conditions on the radio link, such as path loss, channel conditions, the interference due to signals coming from other transmitters, the sensitivity of the receiver, the available transmitter power margin, and the like. As used herein, hybrid automatic repeat request (HARQ) is an error control method using error detection bits and forward error correction bits.

Control signaling is used for the relay link, which is the link between the relay node 200 and the access node 208. Specifically, control signaling is used to handle resource allocation and scheduling, as well as layer one feedback. Control signaling is also used over a direct link, which is a link established directly between the access node 208 and a UA, such as UA 202.

Problems may arise for relay node control signaling due to the possible interference between the access link, direct link, and relay link. Types of typical interference are described further with respect to FIG. 3 and FIG. 4. Further, to transmit on the access link, the relay node and the UAs should acquire and maintain timing alignment that requires sounding reference signal (SRS) resources being allocated to UAs. As used herein, sounding reference signals are signals transmitted to provide a signal for uplink channel condition estimation and timing alignment estimation. Sounding reference signals could be used on the uplinks of the relay link, access link or direct link. For example, in order to perform the uplink transmission over the direct link, the UA should send SRS to the access node. As another example, in order to perform the uplink transmission over the access link, the UA should send SRS to the relay node.

Returning to FIG. 2, possible required control signaling over a direct link, a relay link, and an access link are shown. A direct link is shown as the link between UA 202 and access node 208, as further shown by arrow 210 and arrow 212. A relay link is shown as the link between the relay node 200 and the access node 208, as further shown by arrow 214 and arrow 216. An access link is shown as the link between UA 204 and relay node 200, and as further shown by arrow 218 and arrow 220.

Because the access node 208 can treat the relay node 200 as if the relay node 200 were a UA, the relay link may share the same physical downlink control channel (PDCCH), physical uplink control channel (PUCCH), and sounding reference signal (SRS) configurations as the direct link between UA 202 and access node 208. In another embodiment, the control signaling over the relay link may be carried over different physical layer control channel other than PDCCH/PUCCH/SRS. As used herein, a physical uplink control channel (PUCCH) refers to a physical uplink channel that carries the channel quality indicator (CQI), multi-input multi-output (MIMO) related feedback, acknowledgement/non-acknowledgement (ACK/NACK) feedback, etc. As used herein a physical uplink control signal resource can include a PUCCH and/or a SRS, and possibly other physical uplink control signal resources.

However, for the access link between UA 204 and relay node 200, possible interference scenarios can arise that should be considered when allocating resources for the control signaling and sounding reference signals transmission. For example, on the downlink, the UA 204 in the relay (donor) cell 206 will monitor the physical downlink control channel (PDCCH) of the access link. In this case, there may exist physical downlink control channel interference coming from the direct link. Similarly, interference also arises for the physical hybrid automatic repeat request indicator channel (PHICH). As used herein, physical hybrid automatic repeat request indicator channel (PHICH) refers to the physical channel over which HARQ feedback is transmitted.

Furthermore, on the uplink, the physical uplink control channel over the access link and over the direct link (or relay link) may also interfere if resources are not coordinated. Considering all of the different types of interference that can arise, control signaling resource coordination is desirable for donor cells, such as relay cell 206.

Figure 3:
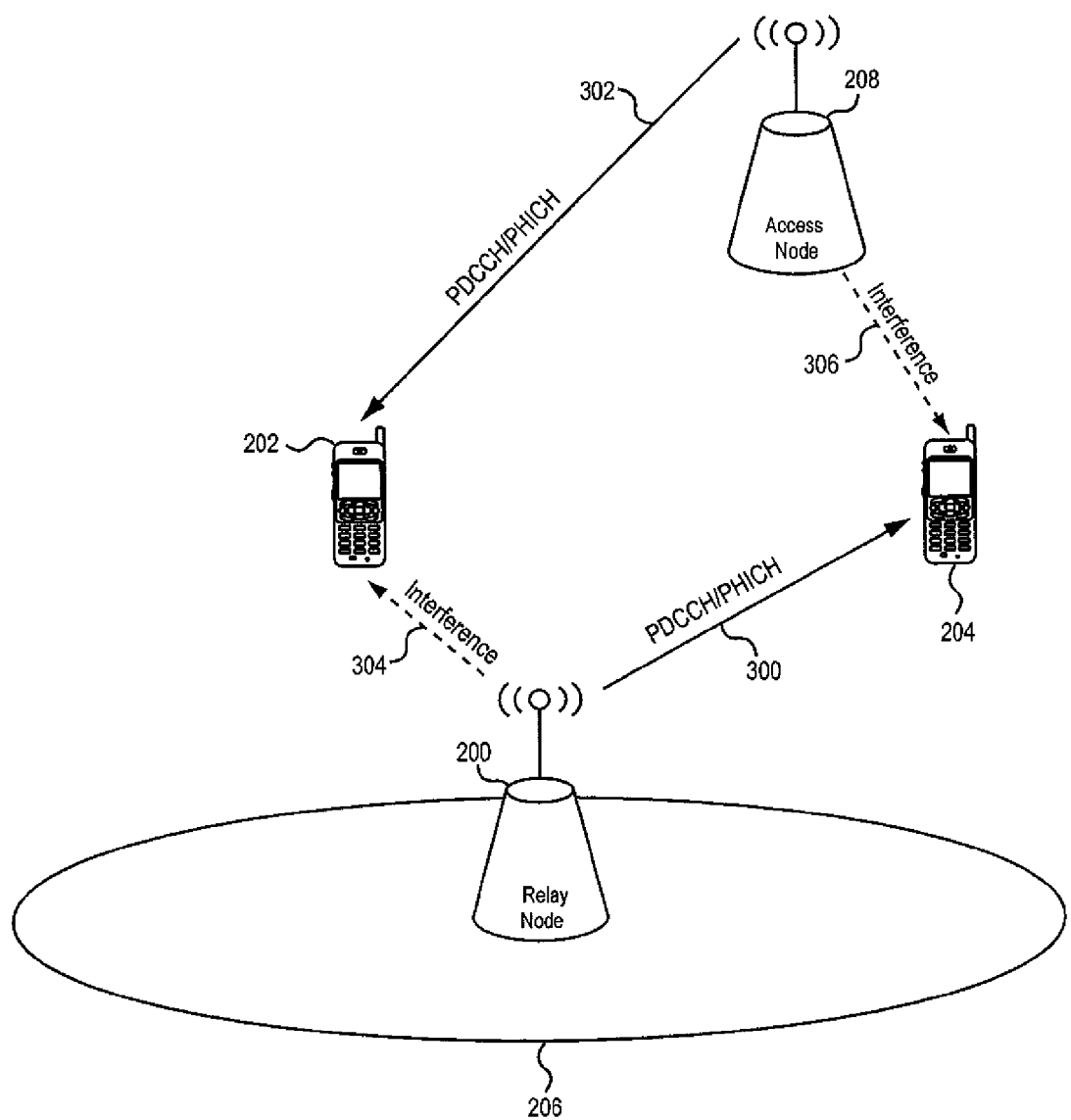
FIG. 3 is a diagram illustrating downlink control signaling interference, according to an embodiment of the disclosure.

FIG. 3 is a diagram illustrating downlink control signaling interference, according to an embodiment of the disclosure. The interference scenarios described with respect to FIG. 3 is one of the interference scenario described with respect to FIG. 2. UA 202, UA 204, relay cell 206, relay cell 206, and access node 208 are similar to corresponding devices in FIG. 1 and FIG. 2, and thus use similar reference numerals.

Specifically, FIG. 3 shows possible physical downlink control channel (PDCCH) and physical hybrid automatic repeat request indicator channel (PHICH) interference on the downlink between the access link and the direct link. The access link, as shown by arrow 300, is the link between relay node 200 and UA 204. The direct link, as shown by arrow 302, is the link between access node 208 and UA 202. Interference on the direct link, as shown by arrow 304, as well as interference on the access link, as shown by arrow 306, is caused by the PDDCH/PHICH simultaneously being exchanged on the access link and the direct links.

To avoid physical downlink control channel interference between the access and direct links, the access node 208 should allocate physical downlink control channel resources for use by relay nodes serviced by access node 208. In turn, relay node 200 can only use those allocated physical downlink control channel resources over the access link, for example, to schedule UAs.

The access node 208 may adjust the allocated resources for the relay node 200 from time-to-time, based on loading conditions and other factors. The UA may only monitor the physical downlink control channel resources allocated to relay node 200. These resources can be signaled to the UAs using radio resource control (RRC) signaling by the access node 208 during the initial association, or using the Broadcast Control Channel (BCCH). Another possible way of signaling resources to UAs is to use the relay node 200. Alternatively, these resources can be pre-configured or pre-defined.

If two relay nodes are spaced far apart, and potential interference is less likely, the allocated physical downlink control channel resources over the access link could be reused. A convenient case is that the reuse factor is one, meaning that no interference avoidance is supported among relay nodes over the physical downlink control channel. Another convenient case is that all the relay nodes may use the same resources as the access node. In this case, no interference coordination is supported.

Note that the physical hybrid automatic repeat request indicator channel resource is linked to the uplink physical uplink shared channel (PUSCH) resource. The physical hybrid automatic repeat request indicator channel interference can be avoided if PUSCH transmissions over the access link and the direct link are on different resources.

Thus, the present disclosure provides, as one possible solution to the problem of interference from simultaneous transmissions from the access link and direct link, for the access node 208 to assign or coordinate the physical downlink control channels and physical hybrid automatic repeat request indicator channels. Assignment can be implemented dynamically, semi-statically, or statically. In some embodiments, where possible, assignment of control channel resources by the access node should be as autonomous as possible.

In turn, the relay node only uses the allocated downlink control signaling resource to avoid interference. Thus, the relay node 200 and the access node 208 can cooperate to avoid interference between UA 202 on a direct link and UA 204 on an access link.

Figure 4:
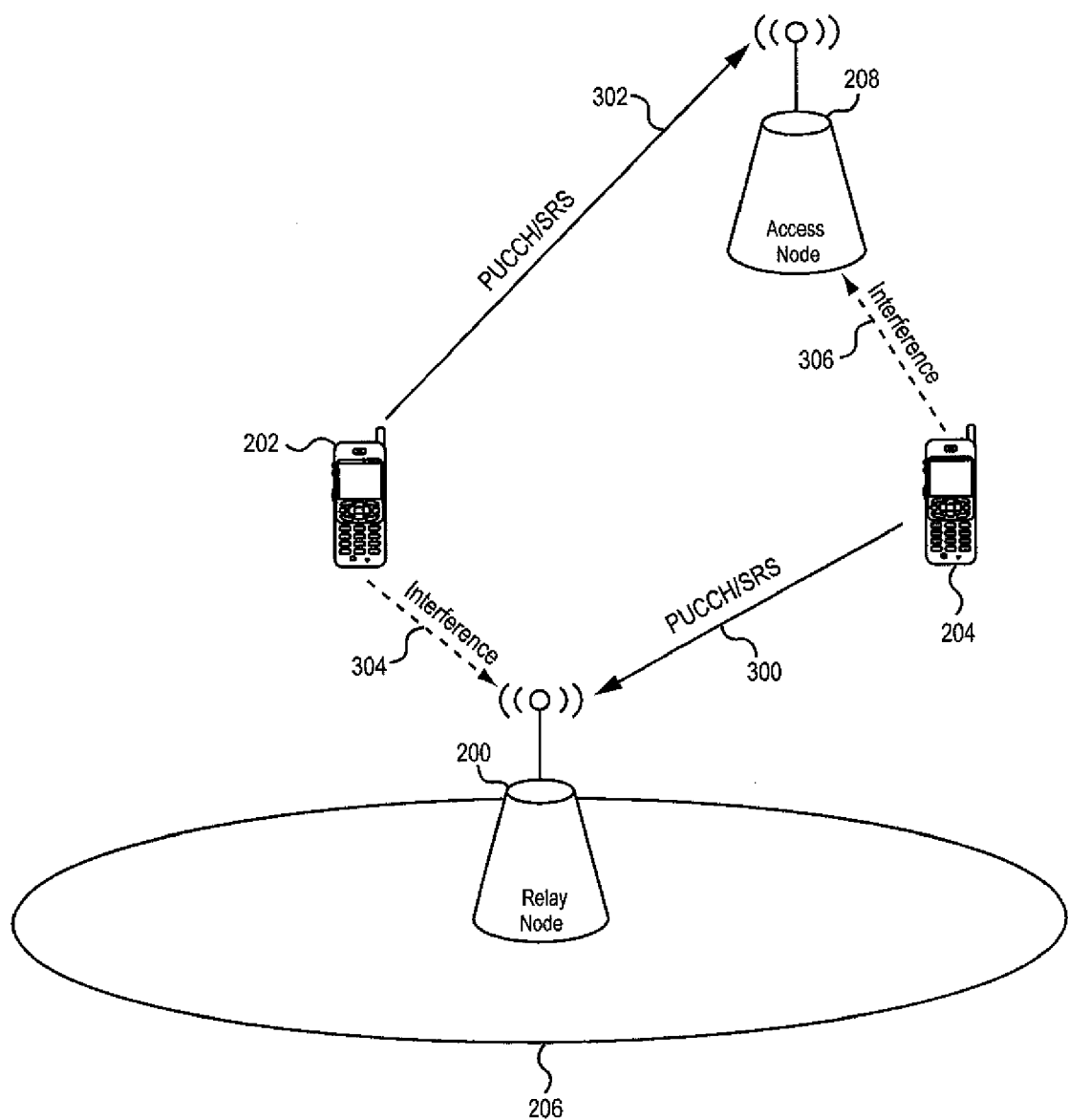
FIG. 4 is a diagram illustrating uplink control signaling interference, according to an embodiment of the disclosure.

FIG. 4 is a diagram illustrating uplink control signaling interference, according to an embodiment of the disclosure. Like FIG. 3, the interference scenario described with respect to FIG. 4 is one of the interference scenarios described with respect to FIG. 2. UA 202, UA 204, relay cell 206, relay cell 206, and access node 208 are similar to corresponding devices in FIG. 1 and FIG. 2, and thus use similar reference numerals. Objects in FIG. 4 that are common to FIG. 3 likewise share similar reference numerals.

Specifically, FIG. 4 shows possible interference for the physical uplink control channel (PUCCH) and the sounding reference signal (SRS) over the direct link and the access link. Together, the PUCCH and the SRS can be referred to as physical uplink control signaling resources. As in FIG. 3, the access link, as shown by arrow 300, is the link between relay node 200 and UA 204. The direct link, as shown by arrow 302, is the link between access node 208 and UA 202. Interference on the direct link, as shown by arrow 304, as well as interference on the access link, as shown by arrow 306, is caused by the PUCCH and SRS simultaneously being exchanged on the access link and the direct links.

Again, to avoid the problem of interference on the uplink, the access node 208 can act as a central control mechanism for uplink control signaling resources. Examples of uplink control signaling resources include sounding reference signals (SRSs) and PUCCH resources, including an uplink channel quality indicator (CQI), a preceding matrix indicator (PMI), and a rank indication (RI). The uplink resources are determined by the access node 208 and signaled to the UA 204 using radio resource control signaling. This control signaling may be implemented via the relay node 200. This procedure may be performed for each UA camped on the relay, e.g., for each UA in a RRC_CONNECTED state, including the direct link UA 202 and the access link UA 204. However, if a UA is connected to the relay node, then that UA may receive the signaling of allocated PUCCH resources via the relay link instead of via the direct link.

In one embodiment, the access node 208 signals the allocated physical uplink control channel and sounding reference signal (PUCCH and SRS) resources (physical uplink signaling resources) for the access link UA 204, as well as for relay node 200. The access node 208 accomplishes this task via radio resource control signaling during, for example, the initial attachment procedure, or radio resource control reconfiguration procedure. Uplink CQI, PMI, RI, and SRS resource reuse is allowed when two UAs are attached to two different relay nodes which are far away. This uplink resource reuse is allowed because access node 208 has the overall information about all relay nodes and their corresponding camped UAs. As used here, the term "camped" means that the UA is connected to or in communication with a corresponding device, such as a relay node or access node.

The uplink non-acknowledgement/acknowledgement (NACK/ACK) resource is associated with the downlink physical downlink control channel resource. If the downlink physical downlink control channel from the access node 208 and relay node 200 are over different resources in the same transmission time interval (TTI), no interference exists for the uplink NACK/ACK resources. On the relay link (arrow 300), the CQI, PMI, RI, and SRS resources are allocated by the access node 208. However, because the relay node 200 is possibly a fixed, line-of-sight link, the required resource may be very small.

Figure 5A:
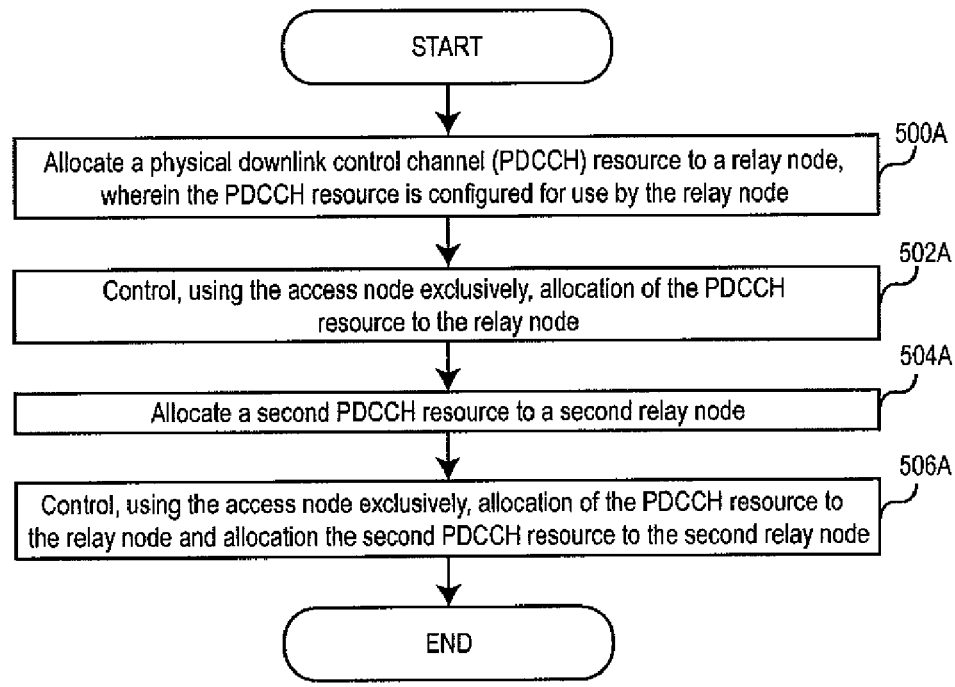
FIG. 5A is a flowchart of a method for allocating downlink physical downlink control channel resources using an access node, according to an embodiment of the disclosure.

FIG. 5A is a flowchart of a method for allocating downlink physical downlink control channel resources using an access node, according to an embodiment of the disclosure. The process shown in FIG. 5A can be implemented using the devices and methods described with respect to FIG. 1 through FIG. 4. In particular, the process shown in FIG. 5A is implemented, at least in part, in an access node.

The process begins as the access node allocates a physical downlink control channel (PDCCH) resource to a relay node, wherein the PDCCH resource is configured for use by the relay node (block 500A). The access node then controls, using the access node exclusively, allocation of the PDCCH resource to the relay node (block 502A). In this manner, the access node controls allocation of all PDCCH resources to the relay node and also to any other relay nodes served by the access node. The access node also controls all PDCCH resource allocations for UAs that are in direct communication (direct link) with the access node.

The following process blocks, blocks 504A and 506A are optional, but can be used to further improve service. Process blocks 504A and 506A are provided to show that the access node may control allocation of physical downlink control channel resources to more than one relay node.

First, the access node allocates a second physical downlink control channel (PDCCH) resource to a second relay node (block 504A). The access node then controls, using the access node exclusively, allocation of the PDCCH resource to the relay node and allocation of the second PDCCH resource to the second relay node (block 514A). The process terminates thereafter.

Figure 5B:
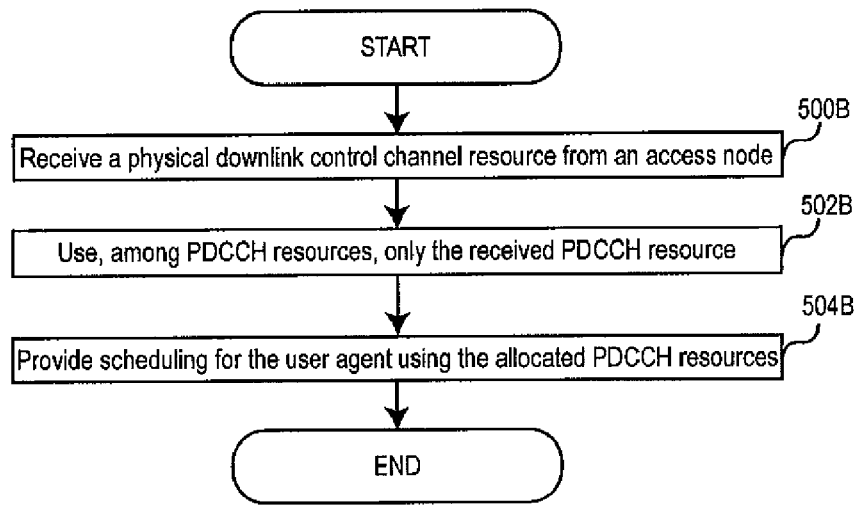
FIG. 5B is a flowchart of a method for accepting downlink physical downlink control channel resources using a relay node, according to an embodiment of the disclosure.

FIG. 5B is a flowchart of a method for accepting downlink physical downlink control channel resources using a relay node, according to an embodiment of the disclosure. The process shown in FIG. 5B can be implemented using the devices and methods described with respect to FIG. 1 through FIG. 4. In particular, the process shown in FIG. 5B is implemented, at least in part, in a relay node.

The process begins as the relay node receives a physical downlink control channel (PDCCH) resource from an access node (block 500B). The relay node then uses, among PDCCH resources, only the received PDCCH resource (block 502B). The relay node can also provide scheduling for the UA using the allocated PDCCH resources (block 504B). The process terminates thereafter.

Figure 6A:
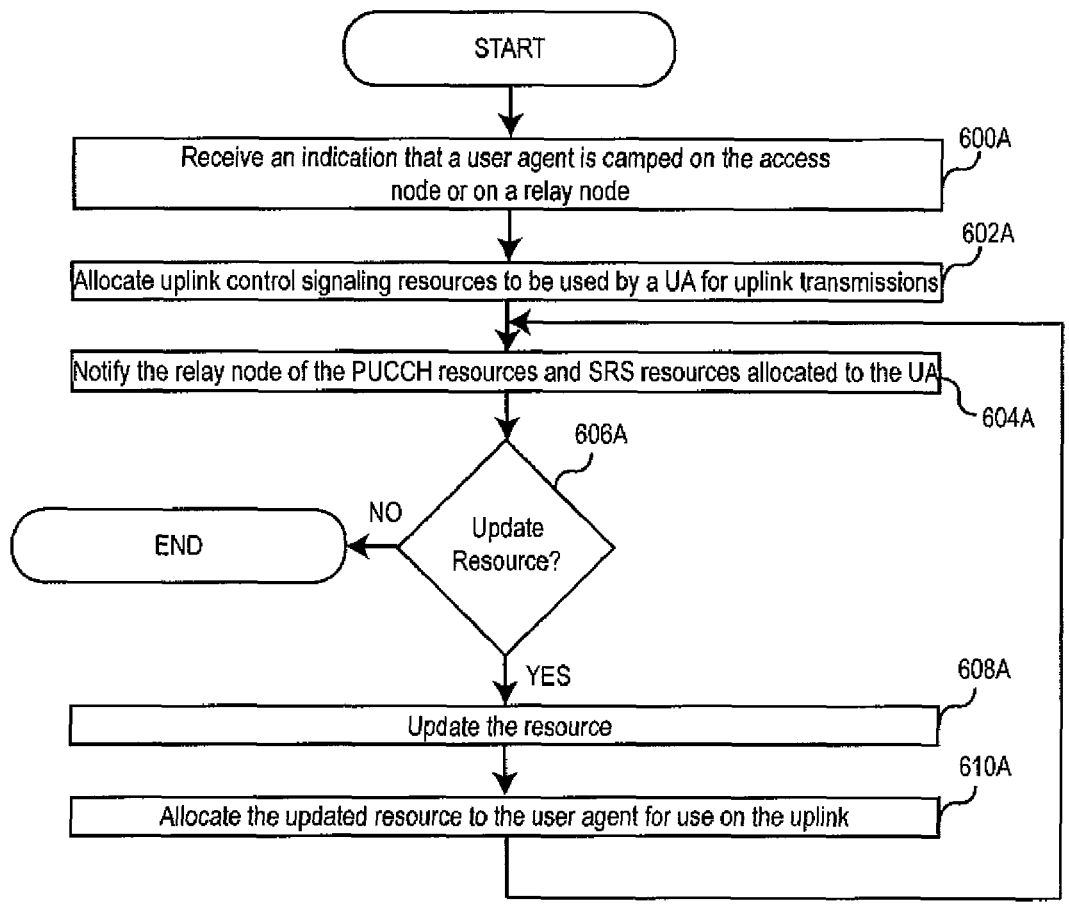
FIG. 6A is a flowchart of a method for allocating uplink physical downlink control channel resources using an access node, according to an embodiment of the disclosure.

FIG. 6A is a flowchart of a method for allocating uplink physical downlink control channel resources using an access node, according to an embodiment of the disclosure. The process shown in FIG. 6A can be implemented using the devices and methods described with respect to FIG. 1 through FIG. 4. In particular, the process shown in FIG. 6A is implemented, at least in part, in an access node.

The process begins as the access node receives an indication that a UA is camped on the access node or on a relay node (block 600A). The access node then allocates uplink control signaling resources for use by a UA for uplink transmissions (block 602A), for example, PUCCH resource and the SRS resource. Examples of PUCCH resources include a channel quality indicator (CQI), a preceding matrix indicator (PMI), a rank indication (RI), sounding reference signal (SRS), and other possible PUCCH resources.

Optionally, the access node notifies the relay node of the PUCCH resources and SRS resources (physical uplink control signaling resources) allocated to the UA (block 604A). This notification should occur if the UA is camped on the relay node.

Optionally, the access node determines whether to update a resource (block 606A). If the resource is to be updated, then the access node updates the resource (block 608A). The access node then allocates the updated resource for the UA for use on the uplink (block 610A). The process returns to step 604A, in which the access node notifies the relay node of the updated resource. Returning to block 606A, if no update to the resource is to be made, then the process terminates.

Thus, the embodiments provide for an access node a corresponding method. The access node is configured to promote transmission of a physical uplink control signaling resource to a user agent. The physical uplink control signaling resource is configured by the access node for uplink transmission by a user agent. The access node is further configured to exclusively control allocation of the physical uplink control signaling resource.

In an embodiment, the user agent is in communication with a relay node. In this case, the processor may be further configured to promote transmission of the physical uplink control channel signaling resource to the relay node.

In another embodiment, the physical uplink control signaling resource is one of a physical uplink control channel (PUCCH) and a sounding reference signal (SRS). The physical uplink control signaling resource can be a PUCCH resource that comprises at least one of an uplink channel quality indicator (CQI), a preceding matrix indicator (PMI), and a rank indication (RI). The access node may be further configured to determine at least one of the PUCCH resource and the SRS resource.

In another embodiment, the physical uplink control signaling resource is transmitted over one of a direct link, an access link, and a relay link. The access node may be further configured to transmit at least one of the PUCCH resource and a SRS resource using radio resource control (RRC) signaling.

Figure 6B:
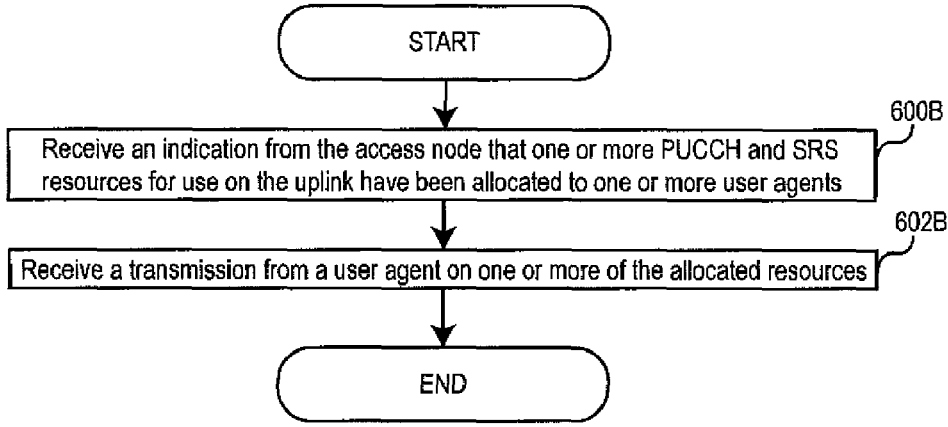
FIG. 6B is a flowchart of a method for accepting uplink physical downlink control channel resources using a relay node, according to an embodiment of the disclosure.

FIG. 6B is a flowchart of a method for accepting physical uplink control channel resources using a relay node, according to an embodiment of the disclosure. The process shown in FIG. 6B can be implemented using the devices and methods described with respect to FIG. 1 through FIG. 4. In particular, the process shown in FIG. 6B is implemented, at least in part, in a relay node.

The process begins as the relay node receives an indication from the access node that one or more PUCCH and SRS resources for use on the uplink have been allocated to one or more UAs (block 600B). Examples of such PUCCH resources include a channel quality indicator (CQI), a preceding matrix indicator (PMI), a rank indication (RI), sounding reference signal (SRS), and other possible PUCCH resources. The relay node then receives a transmission from a UA on one or more of the allocated resources for the UAs (block 602B). The process terminates thereafter.

Figure 7:
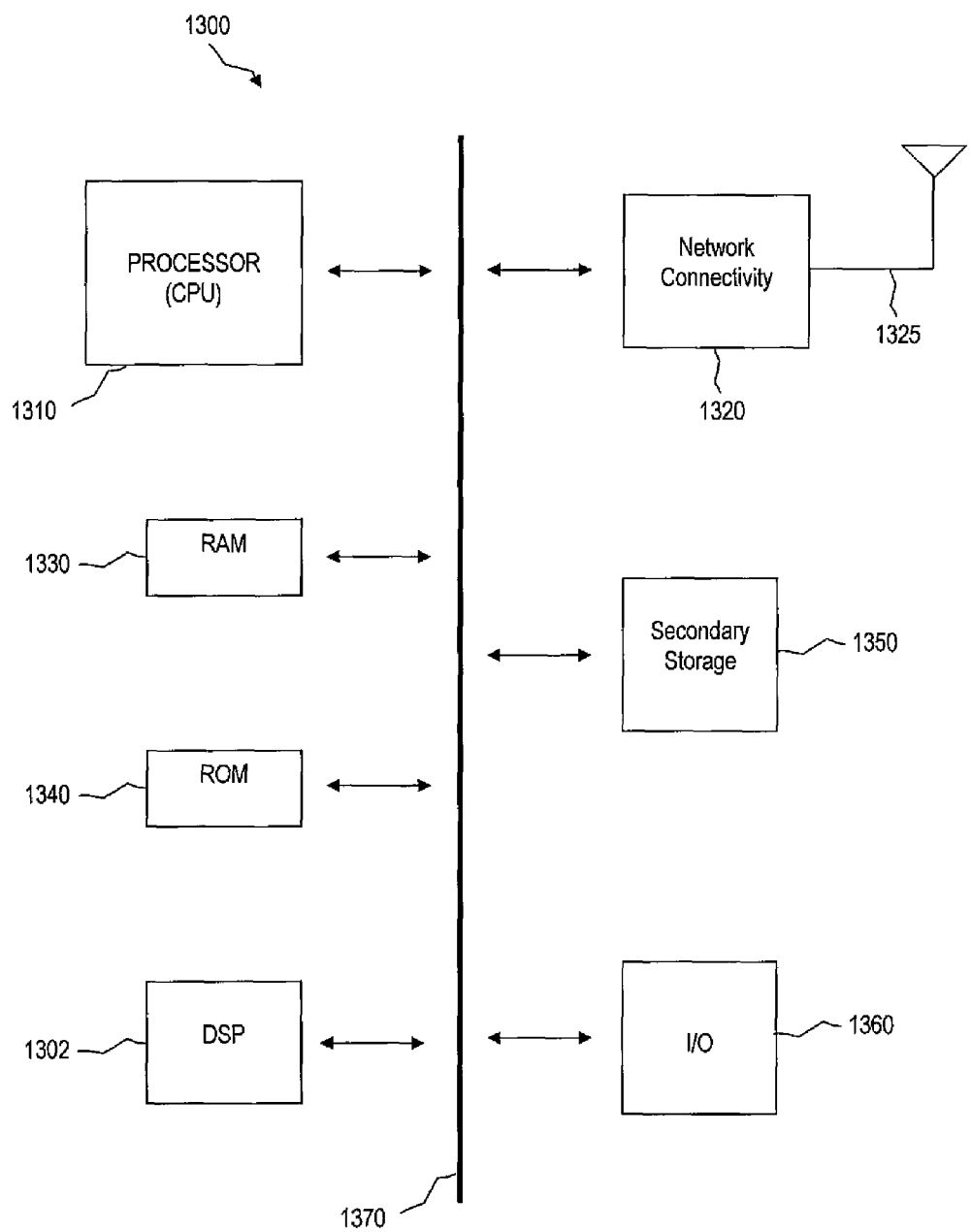
FIG. 7 illustrates an example of a system that includes a processing component suitable for implementing one or more embodiments disclosed herein.

The UA (UA) 110 and other components described above might include a processing component that is capable of executing instructions related to the actions described above. FIG. 7 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1302. Although the DSP 1302 is shown as a separate component, the DSP 1302 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320.

The following are incorporated herein by reference for all purposes: 3rd Generation Partnership Project (3GPP) Technical Specification (TS) 36.813 and 3GPP TS 36.814.

An access node, comprising a processor configured to promote allocation of a physical downlink control channel (PDCCH) resource to a relay node, wherein the PDCCH resource is configured for use by the relay node, and wherein the access node is further configured to exclusively control allocation of the PDCCH resource.

A method implemented in an access node. The method comprising allocating a physical downlink control channel (PDCCH) resource to a relay node, wherein the PDCCH resource is configured for use by the relay node. The method further comprising controlling, using the access node exclusively, allocation of the PDCCH resource.

A relay node including a processor configured to promote receiving a physical downlink control channel (PDCCH) resource from an access node, and wherein the relay node is further configured to use the received PDCCH resource.

A method implemented in a relay node including receiving a physical downlink control channel (PDCCH) resource from an access node, and using, among at least some PDCCH resources, only the received PDCCH resource.

An access node having a processor configured to promote transmission of a physical uplink control signaling resource to a user agent, wherein the physical uplink control signaling resource is configured by the access node for uplink transmission by the user agent, and wherein the access node is further configured to exclusively control allocation of the physical uplink control signaling resource.

A method implemented in an access node. The method including transmitting a physical uplink control signaling resource to a user agent, wherein the physical uplink control signaling resource is configured by the access node for uplink transmission by the user agent. The method further including controlling, using the access node exclusively, allocation of the physical uplink control signaling resource. A user agent having a processor configured to promote receiving a physical uplink control signaling resource from an access node, and wherein the user agent is further configured to use, among at least some physical uplink control signaling resources, only the received physical uplink control signaling resource.

A method implemented in a user agent. The method including receiving a physical uplink control signaling resource from an access node. The method further including using, among at least some physical uplink control signaling resources, only the received physical uplink control signaling resource.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An access node for use in a wireless network including a relay node, a first user equipment, and a second user equipment, wherein the access node and the relay node are configured to establish a relay link, wherein the relay node and the first user equipment are configured to establish an access link, wherein the access node and the second user equipment are configured to establish a direct link, and wherein the relay link and the direct link share the same physical downlink control channel, the access node comprising:
    a processor configured such that the access node services the relay node,
    wherein the processor is further configured to allocate a physical downlink control channel (PDCCH) resource to the relay node for use by the relay node to schedule the first user equipment so as to overcome signaling interference between the access link and the direct link.

2. The access node of claim 1, wherein the access node is further configured to allocate the PDCCH resource to the second user equipment to provide scheduling information for the second user equipment.

3. The access node of claim 1, wherein the access node is further configured to allocate a second PDCCH resource to a second relay node, and wherein the access node exclusively controls allocation of PDCCH resources to both the relay node and the second relay node.

4. The access node of claim 1, wherein the access node is further configured to determine the PDCCH resource.

5. The access node of claim 1, wherein the access node is further configured to transmit the PDCCH resource using radio resource control (RRC) signaling.

6. The access node of claim 1, wherein the relay node is one of a layer two relay node or a layer three relay node.

7. A method implemented in an access node in a wireless network including a relay node, a first user equipment, and a second user equipment, wherein the access node and the relay node are configured to establish a relay link, wherein the relay node and the first user equipment are configured to establish an access link, wherein the access node and the second user equipment are configured to establish a direct link, and wherein the relay link and the direct link share the same physical downlink control channel, the method comprising:
    allocating, by the access node, a physical downlink control channel (PDCCH) resource to the relay node serviced by the access node, wherein the PDCCH resource is allocated for use by the relay node to schedule the first user equipment so as to overcome signaling interference between the access link and the direct link.

8. The method of claim 7, further comprising allocating, by the access node, the PDCCH resource to the second user equipment to provide scheduling information for the second user equipment.

9. The method of claim 7, further comprising:
    allocating a second PDCCH resource to a second relay node; and
    controlling, using the access node exclusively, allocation of the PDCCH resource to the relay node and allocation of the second PDCCH resource to the second relay node.

10. The method of claim 7, further comprising:
    determining the PDCCH resource using the access node.

11. The method of claim 7, further comprising:
    transmitting, by the access node, the PDCCH resource using radio resource control (RRC) signaling.

12. A relay node for use in a wireless network including an access node, a first user equipment, and a second user equipment, wherein the access node and the relay node are configured to establish a relay link, wherein the relay node and the first user equipment are configured to establish an access link, wherein the access node and the second user equipment are configured to establish a direct link, and wherein the relay link and the direct link share the same physical downlink control channel, the relay node comprising:
    a processor configured such that the relay node is serviced by the access node,
    wherein the relay node is configured to receive a physical downlink control channel (PDCCH) resource allocated by the access node, and
    wherein the relay node is further configured to use the received PDCCH resource to schedule the first user equipment so as to overcome signaling interference between the access link and the direct link.

13. The relay node of claim 12, wherein the relay node is further configured to provide scheduling information for the first user equipment, using the received PDCCH resource.

14. A method implemented in a relay node in a wireless network including an access node, a first user equipment, and a second user equipment, wherein the access node and the relay node are configured to establish a relay link, wherein the relay node and the first user equipment are configured to establish an access link, wherein the access node and the second user equipment are configured to establish a direct link, and wherein the relay link and the direct link share the same physical downlink control channel, the method comprising:
    receiving, by the relay node, a physical downlink control channel (PDCCH) resource allocated by the access node; and
    using the received PDCCH resource to schedule the first user equipment so as to overcome signaling interference between the access link and the direct link.

15. The method of claim 14, further comprising:
providing, by the relay node, scheduling information for the first user equipment, using the received PDCCH resource.

16. An access node for use in a wireless network including a relay node, a first user equipment, and a second user equipment, wherein the access node and the relay node are configured to establish a relay link, wherein the relay node and the first user equipment are configured to establish an access link, wherein the access node and the second user equipment are configured to establish a direct link, and wherein the relay link and the direct link share the same physical downlink control channel, the access node, comprising:
a processor configured such that the access node services the relay node, wherein the access node is configured to determine a physical uplink control signaling resource, and
wherein the processor is further configured to promote transmission of the physical uplink control signaling resource to the first user equipment via the relay link and the access link, wherein the physical uplink control signaling resource is allocated by the access node for uplink transmission from the first user equipment so as to overcome signaling interference between the access link and the direct link.

17. The access node of claim 16, wherein the physical uplink control signaling resource comprises one or more of a physical uplink control channel (PUCCH) and a sounding reference signal (SRS).

18. The access node of claim 16, wherein the physical uplink control signaling resource comprises a PUCCH resource that comprises at least one of an uplink channel quality indicator (CQI), a precoding matrix indicator (PMI), or a rank indication (RI).

19. The access node of claim 16, wherein the access node is configured to transmit the physical uplink control signaling resource using radio resource control (RRC) signaling.

20. A method implemented in an access node in a wireless network including a relay node, a first user equipment, and a second user equipment, wherein the access node and the relay node are configured to establish a relay link, wherein the relay node and the first user equipment are configured to establish an access link, wherein the access node and the second user equipment are configured to establish a direct link, and wherein the relay link and the direct link share the same physical uplink control channel, the method comprising:
determining, by the access node, a physical uplink control signaling resource; and
transmitting, by the access node, the physical uplink control signaling resource to the first user equipment via the relay link and the access link, wherein the physical uplink control signaling resource is allocated by the access node for uplink transmission from the first user equipment so as to overcome signaling interference between the access link and the direct link.

21. The method of claim 20, wherein the physical uplink control signaling resource comprises one or more of a physical uplink control channel (PUCCH) and a sounding reference signal (SRS).

22. The method of claim 20, wherein the physical uplink control signaling resource comprises a PUCCH resource that comprises at least one of an uplink channel quality indicator (CQI), a precoding matrix indicator (PMI), or a rank indication (RI).

23. The method of claim 20, wherein transmitting the physical uplink control signaling resource comprises using radio resource control (RRC) signaling.

24. The method of claim 20, further comprising:
allocating, by the access node, a second physical uplink control signaling resource to the second user equipment; and
controlling, by the access node, both allocation of the physical uplink control signaling resource to the first user equipment and allocation of the second physical uplink control signaling resource to the second user equipment.

25. The method of claim 23, wherein the physical uplink control signaling resource comprises a PUCCH resource, and wherein the method further comprises:
receiving a transmission from the first user equipment on the PUCCH resource via the relay node.

26. The method of claim 20, further comprising:
updating, by the access node, the physical uplink control signaling resource; and
transmitting, by the access node, the updated physical uplink control signaling resource to the first user equipment.

27. A user equipment in a wireless network including an access node, a relay node, another user equipment, wherein the access node and the relay node are configured to establish a relay link, wherein the access node and the other user equipment are configured to establish a direct link, wherein the relay link and the direct link share the same physical uplink control channel, and wherein the access node is configured to service the relay node, the user equipment comprising:
a processor configured such that the user equipment establishes an access link with the relay node,
wherein the user equipment is configured to receive a physical uplink control signaling resource allocated by the access node via the relay link and the access link, and
wherein the user equipment is further configured to use the received physical uplink control signaling resource so as to overcome signaling interference between the access link and the direct link.

28. The user equipment of claim 27, wherein the physical uplink control signaling resource comprises a PUCCH resource that comprises at least one of an uplink channel quality indicator (CQI), a precoding matrix indicator (PMI), or a rank indication (RI).

29. A method implemented in a user equipment in a wireless network including an access node, a relay node, another user equipment, wherein the access node and the relay node are configured to establish a relay link, wherein the access node and the other user equipment are configured to establish a direct link, wherein the relay link and the direct link share the same physical uplink control channel, and wherein the access node is configured to service the relay node, the method comprising:
receiving, by the user equipment, a physical uplink control signaling resource allocated by the access node via the relay link and the access link; and
using, by the user equipment, the received physical uplink control signaling resource so as to overcome signaling interference between the access link and the direct link.

30. The method of claim 29, wherein the received physical uplink control signaling resource comprises a PUCCH resource that comprises at least one of an uplink channel quality indicator (CQI), a precoding matrix indicator (PMI), or a rank indication (RI).

* * * * *